United States Patent
Cecil et al.

(10) Patent No.: US 11,098,673 B2
(45) Date of Patent: Aug. 24, 2021

(54) CYLINDER HEAD WITH INTEGRATED EXHAUST MANIFOLD

(71) Applicant: Cummins Inc., Columbus, IN (US)

(72) Inventors: Adam C. Cecil, Columbus, IN (US); Matthew Behling, Columbus, IN (US); Anthony Kyle Perfetto, Columbus, IN (US)

(73) Assignee: Cummins Inc., Columbus, IN (US)

( * ) Notice: Subject to any disclaimer, the term of this patent is extended or adjusted under 35 U.S.C. 154(b) by 50 days.

(21) Appl. No.: 16/697,568

(22) Filed: Nov. 27, 2019

(65) Prior Publication Data

US 2021/0156335 A1    May 27, 2021

(51) Int. Cl.

| F02F 1/24 | (2006.01) |
|---|---|
| F02F 1/42 | (2006.01) |
| F01P 3/02 | (2006.01) |
| F02F 1/38 | (2006.01) |
| F02B 37/02 | (2006.01) |
| F01N 3/04 | (2006.01) |

(52) U.S. Cl.
CPC .............. *F02F 1/243* (2013.01); *F01N 3/046* (2013.01); *F01P 3/02* (2013.01); *F02B 37/025* (2013.01); *F02F 1/38* (2013.01); *F02F 1/4264* (2013.01); *F01P 2003/024* (2013.01)

(58) Field of Classification Search
CPC .. F02F 1/243; F02F 1/38; F02F 1/4264; F02F 1/40; F01N 3/046; F01P 3/02; F02B 37/025; F02B 37/013
USPC .................... 60/605.1, 321–323; 123/41.82 R
See application file for complete search history.

(56) References Cited

U.S. PATENT DOCUMENTS

| 3,383,092 A * | 5/1968 | Cazier | F02B 37/025 60/605.1 |
|---|---|---|---|
| 3,591,959 A * | 7/1971 | Kubis | F02B 37/025 60/605.1 |
| 4,294,073 A * | 10/1981 | Neff | F02B 37/025 60/597 |
| 4,993,227 A * | 2/1991 | Nagura | F02F 1/243 60/323 |
| 6,786,190 B2 * | 9/2004 | Wu | F02D 17/02 123/198 F |
| 7,966,986 B2 * | 6/2011 | Schmidt | F02F 1/4264 60/323 |
| 8,146,543 B2 | 4/2012 | Kuhlbach et al. | |
| 8,146,544 B2 * | 4/2012 | Lopez-Crevillen | F02F 1/40 123/41.82 R |
| 8,220,264 B2 | 7/2012 | Arvan et al. | |

(Continued)

FOREIGN PATENT DOCUMENTS

| CN | 110905645 A * | 3/2020 | ................ F02F 1/40 |
|---|---|---|---|
| DE | 102015204505 | 9/2016 | |

(Continued)

*Primary Examiner* — Thai Ba Trieu
(74) *Attorney, Agent, or Firm* — Taft Stettinius & Hollister LLP

(57) ABSTRACT

A cylinder head arrangement for an internal combustion engine is provided. The cylinder head includes an integrated exhaust manifold having first and second exhaust passages to collect exhaust gas from respective cylinders to direct the exhaust gas to respective outlets of the cylinder head. The cylinder head includes a flange where the first and second outlets exit the cylinder head for connection with a turbocharger.

21 Claims, 9 Drawing Sheets

(56) References Cited

U.S. PATENT DOCUMENTS

| | | | |
|---|---|---|---|
| 8,714,128 B2 | 5/2014 | Galeazzi et al. | |
| 8,800,525 B2 | 8/2014 | Kuhlbach | |
| 8,839,759 B2 | 9/2014 | Riegger et al. | |
| 8,857,385 B2* | 10/2014 | Beyer | F02F 1/40 123/41.82 R |
| 8,904,773 B2* | 12/2014 | Maruyama | F02F 1/40 60/323 |
| 8,960,137 B2* | 2/2015 | Brewer | F02F 1/243 123/41.82 R |
| 9,140,207 B2* | 9/2015 | Tabuchi | F02F 1/243 |
| 9,784,169 B2 | 10/2017 | Miazgowicz et al. | |
| 9,840,961 B2 | 12/2017 | Craft et al. | |
| 2008/0308050 A1* | 12/2008 | Kuhlbach | F02F 1/243 123/41.82 R |
| 2011/0093182 A1* | 4/2011 | Weber | F02D 41/0007 701/102 |
| 2011/0132296 A1 | 6/2011 | Kuhlbach | |
| 2011/0271916 A1* | 11/2011 | Steiner | F01P 3/02 123/41.82 R |
| 2011/0277723 A1 | 11/2011 | Galeazzi et al. | |
| 2013/0247561 A1* | 9/2013 | Russ | F02B 37/12 60/602 |
| 2014/0223904 A1* | 8/2014 | Wood | F02B 37/013 60/612 |
| 2016/0003196 A1* | 1/2016 | Hang | F02D 41/0065 60/605.2 |
| 2016/0061149 A1* | 3/2016 | Moran | F02F 1/243 123/568.13 |
| 2016/0146150 A1* | 5/2016 | Song | F02F 1/243 60/323 |
| 2017/0145948 A1* | 5/2017 | Chu | F02F 1/243 |
| 2017/0175669 A1 | 6/2017 | Kawakami et al. | |
| 2017/0268455 A1* | 9/2017 | Yang | F02F 1/243 |
| 2017/0292471 A1* | 10/2017 | Nakajima | F02F 1/243 |
| 2017/0314481 A1* | 11/2017 | Karunaratne | F02D 41/22 |
| 2019/0120169 A1* | 4/2019 | Beyer | F02F 1/40 |
| 2019/0153975 A1* | 5/2019 | Oh | F02F 1/40 |
| 2020/0102916 A1* | 4/2020 | Suzuki | F02F 1/42 |

FOREIGN PATENT DOCUMENTS

| | | | |
|---|---|---|---|
| JP | 2000297637 A | * | 10/2000 |
| JP | 2001207841 A | * | 8/2001 |

* cited by examiner

CYLINDER HEAD WITH INTEGRATED EXHAUST MANIFOLD

FIELD OF THE INVENTION

The present disclosure relates generally to internal combustion engines, and more particularly, but not exclusively, to a cylinder head with an integrated exhaust manifold.

BACKGROUND

Internal combustion engines produce a variety of waste gases that are expelled from the cylinders through the cylinder head during operation. Generally, an exhaust manifold is connected to the cylinder head to route the expelled gases from the cylinders through an exhaust passage that can direct the gases to an outlet of the manifold. Exhaust manifolds that are manufactured separately from the cylinder head occupy additional volume and space. Today, cylinder heads with integrated exhaust manifolds have become increasing prevalent in four-cylinder engines. These engines are often configured with a turbocharger, which also occupies additional volume and space as a separate component that is connected to the outlet of the exhaust manifold. When the turbocharger is connected, turbocharger gases are fed through a catalyst system into the atmosphere.

Referring to FIG. 1, a six-cylinder engine assembly is illustrated and includes a cylinder head assembly 102 connected to a separate exhaust manifold 104. The exhaust manifold 104 includes a turbo flange 106 for mounting a turbocharger (not shown). Recent testing of an assembly such as shown in FIG. 1 has revealed higher than desired temperatures at the turbine inlet of the turbocharger. While the high temperatures can be combated with higher temperature materials for the exhaust manifold, the higher temperatures also place increased demand on the catalyst system. Thus, the catalyst system is also required to be larger and/or contain higher amounts of precious metal to meet end of life emissions requirements. The increased requirements for the exhaust manifold and catalyst increase the cost of the overall system. Therefore, further improvements in this technology area are needed to address these issues, among others.

SUMMARY

The present disclosure includes a unique arrangement for a cylinder head of an internal combustion engine. In one embodiment, the cylinder head includes an integrated exhaust manifold having first and second exhaust passages. The first exhaust passage collects exhaust gas from at least three cylinders and directs the exhaust gas to a first outlet of the cylinder head. The second exhaust passage collects exhaust gas from at least three cylinders and directs the exhaust gas to a second outlet of the cylinder head. The cylinder head also includes a flange where the first and second outlets exit the integrated exhaust manifold.

Another embodiment includes an internal combustion engine that includes a cylinder head for receiving exhaust from at least six cylinders and an exhaust manifold integrated with the cylinder head. The exhaust manifold includes a first exhaust passage for collecting exhaust gas from at least three cylinders and directing the exhaust gas to a first half or part of a separated turbocharger inlet duct. The cylinder head also includes a second exhaust passage for collecting exhaust gas from at least three cylinders and directing the exhaust gas to a second half of a separated turbocharger inlet duct. The engine includes a turbocharger to mate with the flange at the opening.

In another embodiment, a cylinder head includes an integrated exhaust manifold with at least one exhaust passage, an upper water jacket, and two separate lower water jackets for circulating a cooling fluid to cool the exhaust in the at least one exhaust passage.

In another embodiment, a cylinder head arrangement includes two separate integrated exhaust passages that exit the cylinder head and mate up with a turbocharger having inlets arranged in a generally side-by-side orientation.

In another embodiment, a cylinder head arrangement includes two separate integrated exhaust passages that exit the cylinder head to mate up with a turbocharger inlet. A first fluid passage connects the first integrated exhaust passage to a common exhaust manifold pressure sensor, and a second fluid passage connects the second integrated exhaust passage to the common exhaust manifold pressure sensor.

In another embodiment, a cylinder head arrangement includes two separate integrated exhaust passages that exit the cylinder head to mate up with a turbocharger inlet. A first passage connects the first integrated exhaust passage to a first exhaust manifold pressure sensor, and a second passage connects the second integrated exhaust passage to a second exhaust manifold pressure sensor.

In another embodiment, a cylinder head arrangement includes two separate integrated exhaust passages that exit the cylinder head to mate up with a turbocharger inlet, an integrated boss to mount an exhaust manifold pressure sensor, and a coolant passage near the exhaust manifold pressure sensor to keep the sensor within a desired temperature range.

Combinations of one or more of the various embodiments are also contemplated as disclosed herein.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like numerals refer to like parts throughout the several views, and wherein.

DETAILED DESCRIPTION OF ILLUSTRATIVE EMBODIMENTS

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

The present disclosure relates to a cylinder head with an integrated exhaust manifold for an internal combustion engine. In certain embodiments, the integrated exhaust manifold includes a cooling system and exhaust manifold pressure sensor. By integrating the exhaust manifold into the cylinder head, more exhaust gas energy than in a conventional non-integrated exhaust manifold may be rejected to the cooling system and thus reduce turbine inlet temperatures. The cylinder head and integrated exhaust manifold may also provide quicker heat up of coolant and lubrication fluid, reduced catalyst thermal load, smaller packaging space, reduced system weight, improved heat shielding to surrounding components, and shorter turbo response time due to less exhaust mass.

Figure 1:
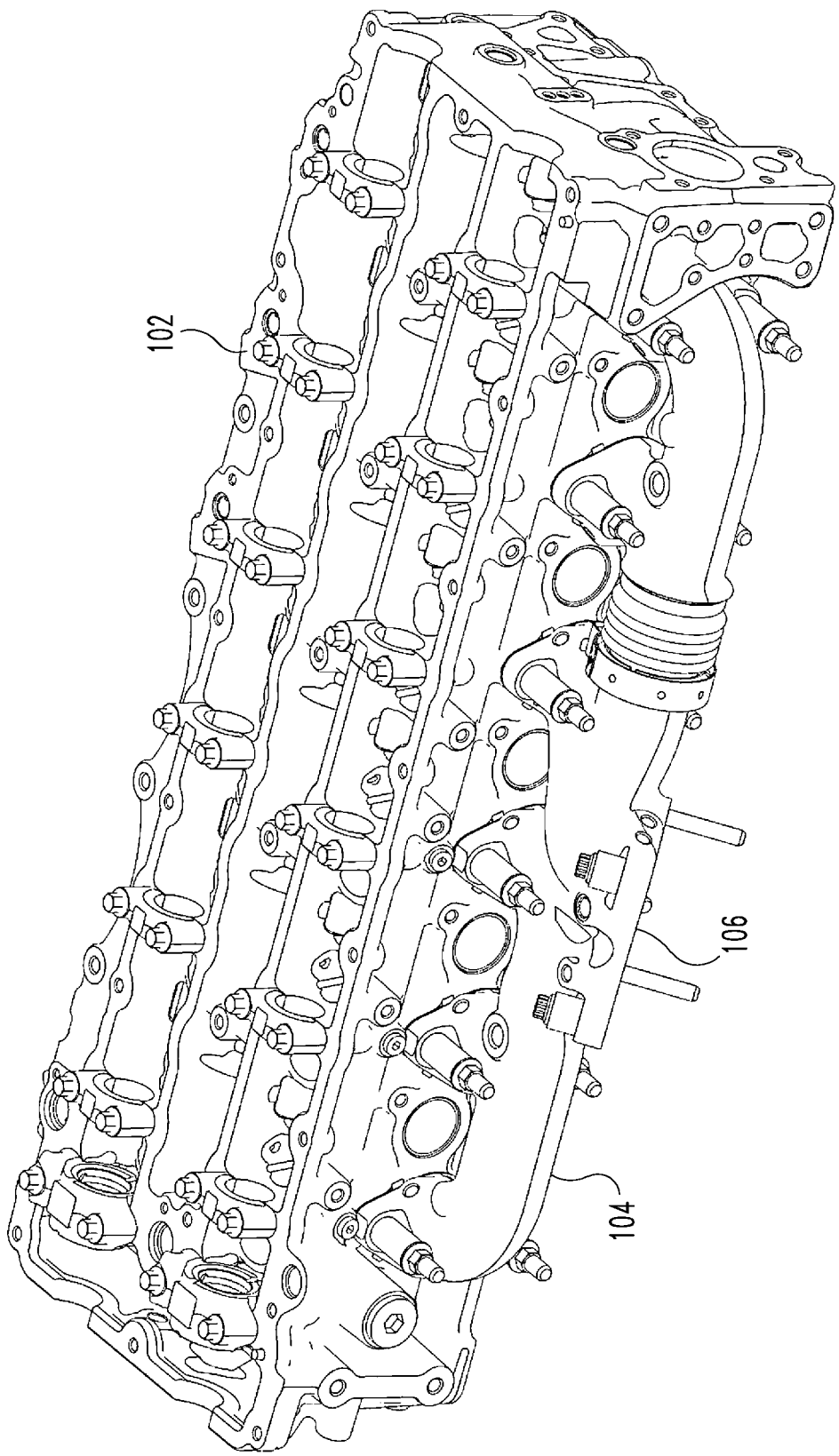
FIG. 1 is a perspective view of a conventional cylinder head assembly with a separate exhaust manifold.
Figure 2:
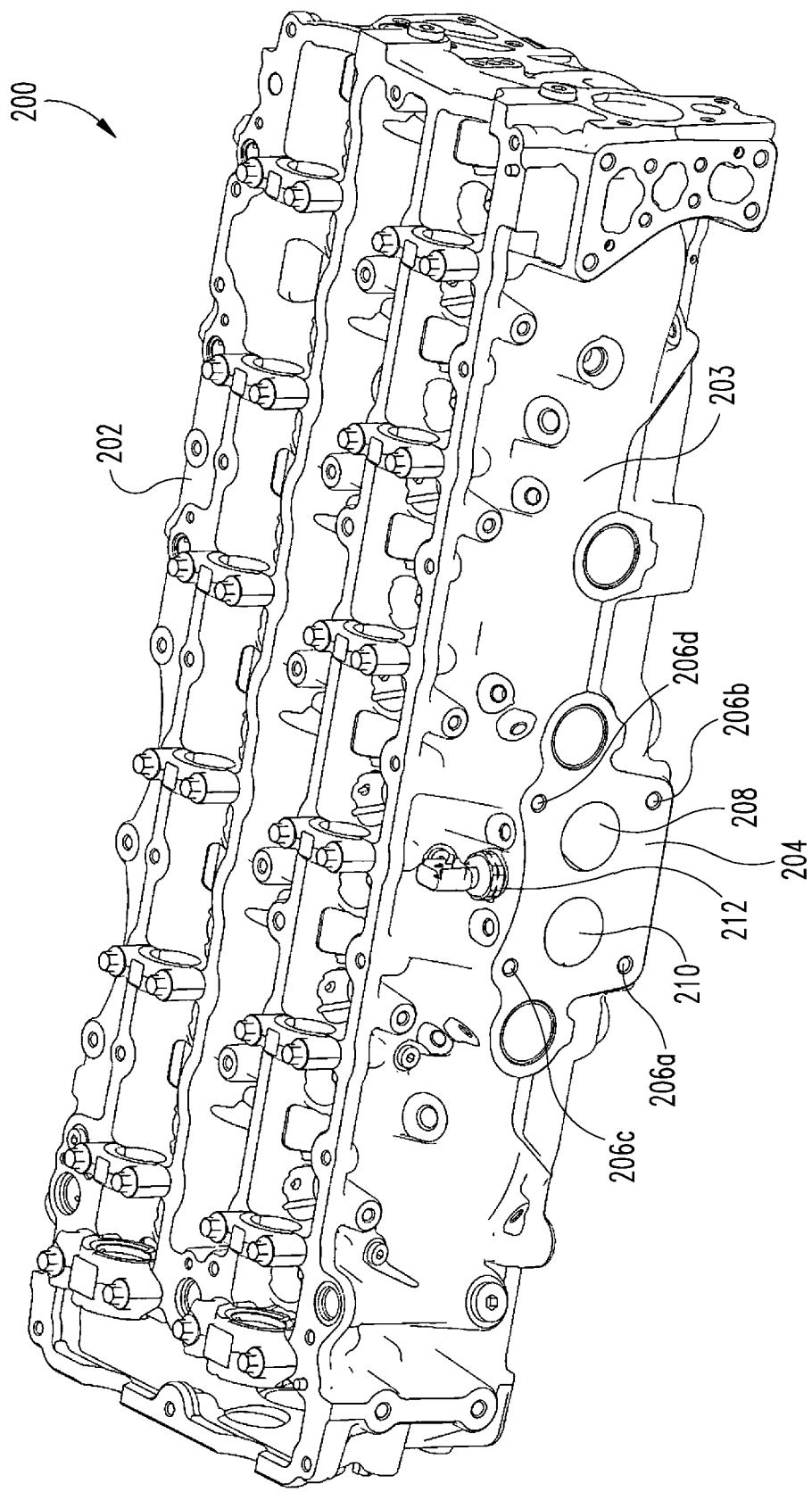
FIG. 2 is a perspective view of a cylinder head assembly with an integrated exhaust manifold, according to an embodiment of the present disclosure.

Referring to FIG. 2, a perspective view of a cylinder head arrangement or assembly 200 includes a cylinder head 202 with an integrated exhaust manifold 203. As shown in FIG. 2, the integrated exhaust manifold 203 includes a flange 204 for mounting a turbocharger (not shown). In an example embodiment, the integrated exhaust manifold 203 having the flange 204 may include a plurality of mounting bosses 206a, 206b, 206c, and 206d for securing a turbocharger to the flange 204. The flange 204 may be configured at a portion of the integrated exhaust manifold 203 in which gas from the cylinder head 202 is collected and directed out of integrated exhaust manifold 203 at outlets 208 and 210.

In the example embodiment, the outlets 208 and 210 are configured at an exhaust gas outlet portion of the integrated exhaust manifold 203 where an inlet of a turbocharger (not shown) is coupled. The outlets 208 and 210 may be arranged in a side-by-side orientation to mate up with corresponding and generally side-by-side separated halves of the turbocharger inlet. In FIG. 2, the outlets 208 and 210 are illustrated with a circular duct configuration; however, alternative shaped configurations of the outlets may be contemplated. The integrated exhaust manifold 203 may include an exhaust manifold pressure sensor 212 (to be described later) positioned near the turbocharger flange 204.

Figure 3:
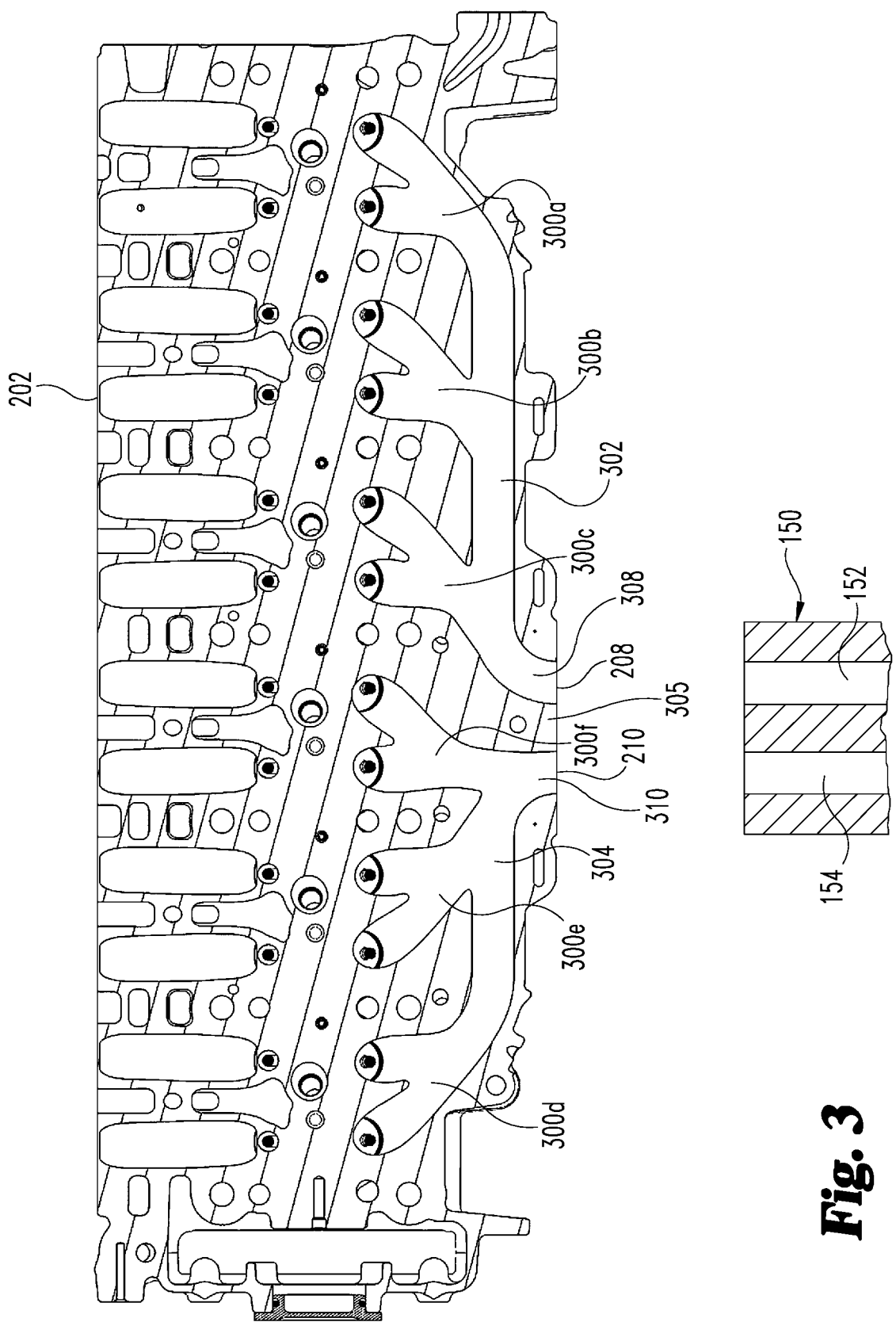
FIG. 3 is a cross-sectional view of the cylinder head with integrated exhaust manifold with exhaust port passages of a six-cylinder engine.

Referring to FIG. 3, a cross sectional view of the cylinder head with integrated exhaust manifold 203 is shown with six cylinders 300a, 300b, 300c, 300d, 300e, and 300f. In FIG. 3, the integrated exhaust manifold 203 may include a first exhaust passage 302 at one side of the integrated exhaust manifold 203 configured to collect exhaust gas from cylinders 300a, 300b, and 300c. The first exhaust passage 302 collects and directs the gases to a first duct 308 where the gases exit the integrated exhaust manifold 203 at outlet 208. At another side opposite the one side, the integrated exhaust manifold 203 may include a second exhaust passage 304 configured to collect exhaust gas from cylinders 300d, 300e, and 300f. The second exhaust passage 304 collects and directs the gases to a second duct 310 where the gases exit the integrated exhaust manifold 203 at outlet 210. The outlets 208 and 210 may be formed at the flange surface 305. A turbocharger 150 with generally side-by-side inlets 152, 154 may be secured to the flange 204 to receive exhaust flow from respective ones of the outlets 208, 210.

Figure 4:
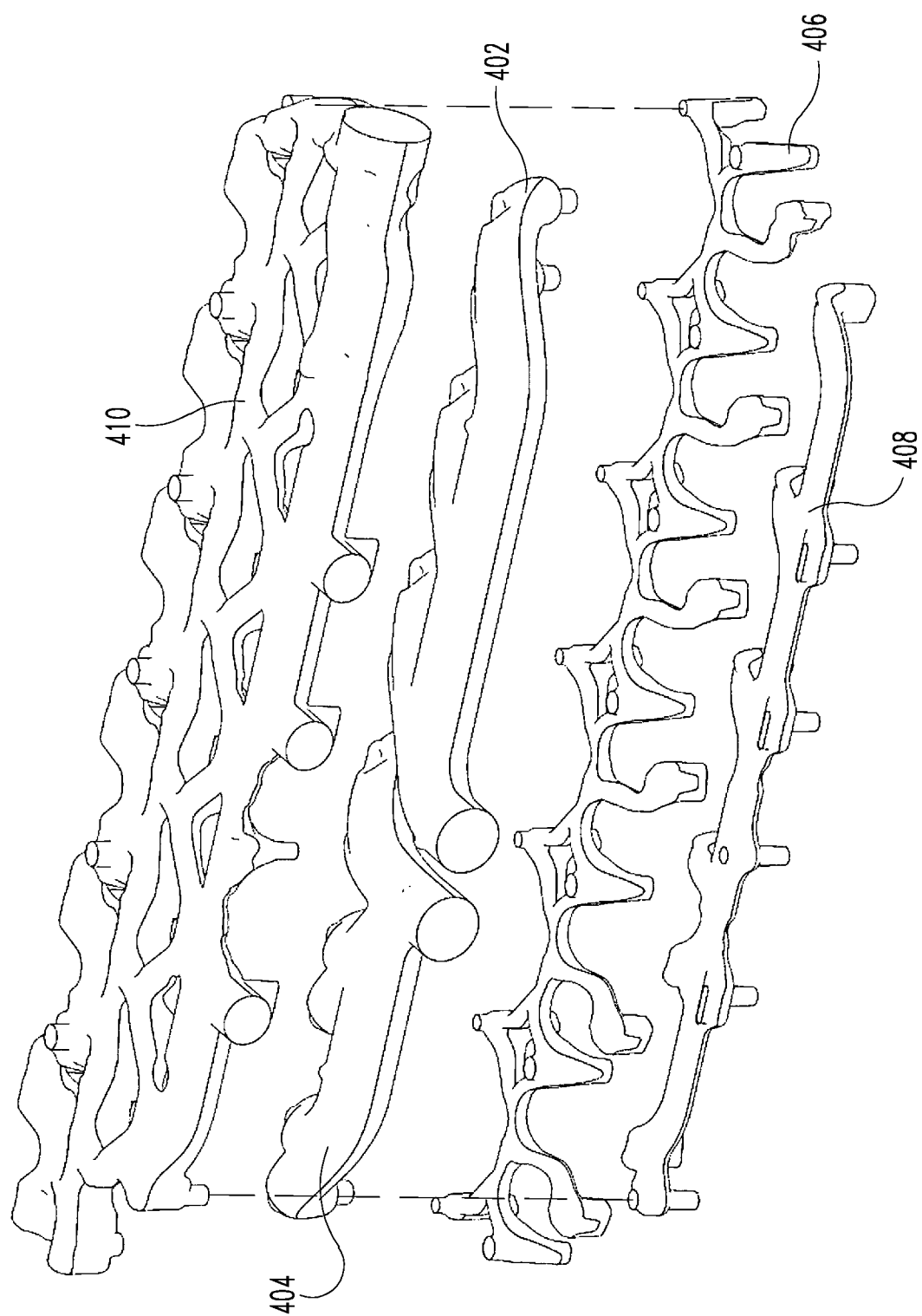
FIG. 4 is an exploded perspective view of the first and second exhaust port cores and cooling system water jackets.

Referring to FIG. 4, there are shown first and second exhaust passage cores 402, 404 for the exhaust passages 302, 304, respectively. In addition, cooling system water jacket cores 406, 408, and 410 are shown in exploded relation to the exhaust passage cores 402, 404. Although illustrated in FIG. 4 as separate components, the first and second exhaust passage cores 402 and 404 may be joined outside of the casting envelope for manufacturing purposes.

The cylinder head 202 and integrated exhaust manifold 203 may be cast by including the first and second lower water jacket cores 406 and 408, and an upper water jacket core 410, to form cooling passages that interface with a cooling system (to be described below) provided in a cylinder block (not shown). The first lower water jacket core 406 may be positioned at a center portion of the integrated exhaust manifold 203 and below the first and second exhaust passage cores 402 and 404. The second lower water jacket core 408 may be positioned at an outer boundary portion of the integrated exhaust manifold 203 and below the first and second exhaust passage cores 402 and 404. It should be understood that the lower water jacket cores 406, 408 are shown as separated in the exploded view of FIG. 4 and may be referred to separately herein, but it is contemplated that the lower water jacket cores 406, 408 may be joined or linked together as a single core within the casting. The upper water jacket core 410 may be positioned above the first and second exhaust passage cores 402 and 404.

Figure 5:
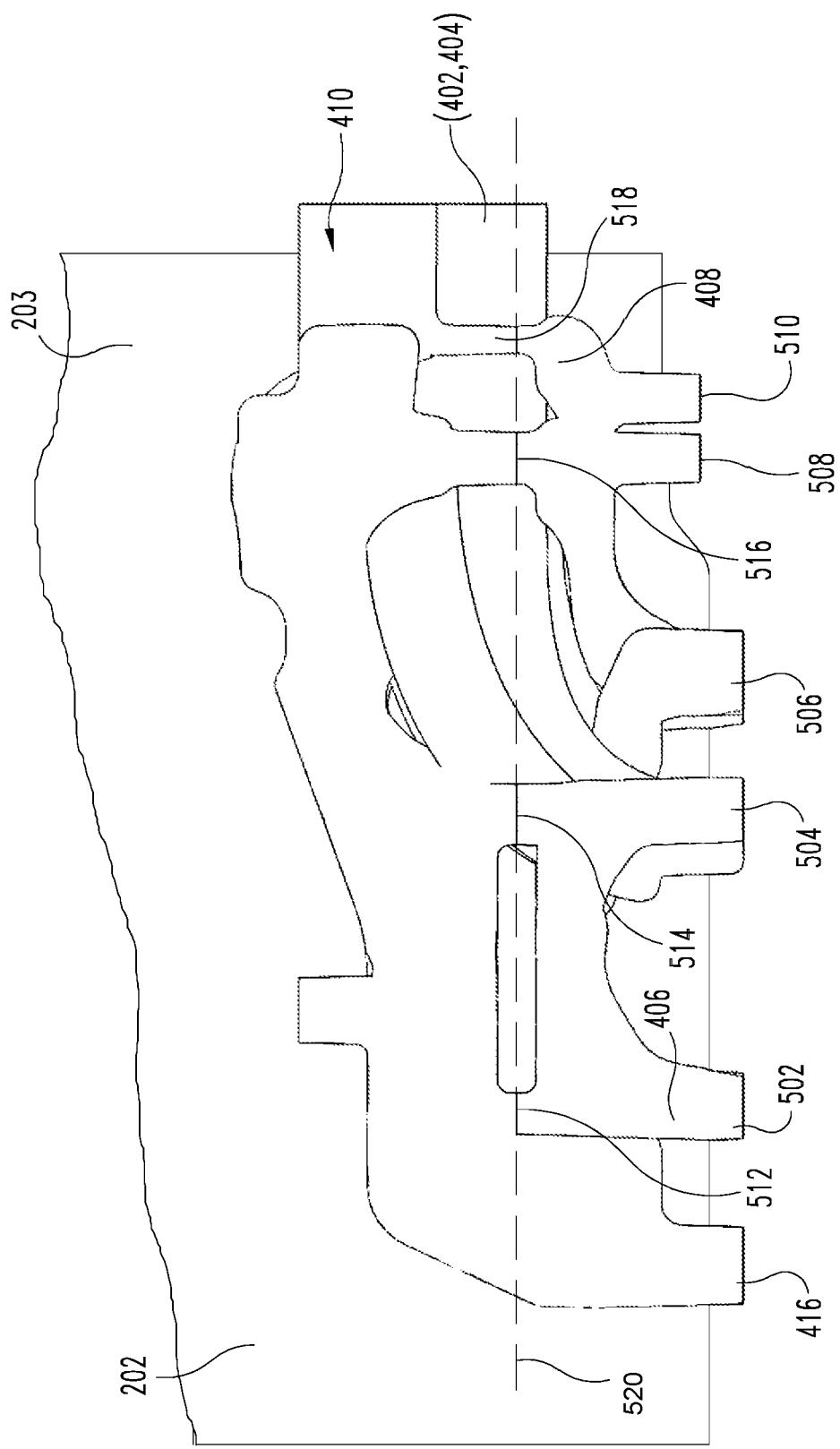
FIG. 5 is a rear view of the first and second exhaust port cores and cooling system water jackets assembled in the cylinder head with integrated exhaust manifold body.

Referring to FIG. 5, a rear view of the assembled exhaust passage cores 402, 404, and water jacket cores 406, 408, 410 is illustrated before the cylinder head 202 and integrated exhaust manifold 203 are cast therearound. The first lower water jacket core 406 may be anchored in the casting tooling and protrudes from a lower portion of the integrated exhaust manifold 203 with legs 502, 504, and 506. A portion of the upper water jacket core 410 may protrude from the body 202 toward a common shared vertical plane with a portion of the first and second exhaust port cores 402 and 404 that also protrude from the body 202. The second lower water jacket 408 may also be anchored in the casting tooling and protrudes from a lower portion of the body 202 with legs 508, 510. The upper water jacket 410 may be anchored in the casting tooling and protrudes from a lower portion of the body with leg 416. The upper water jacket 410 is positioned in the body 202 to interface with the first lower water jacket 406 at interface points 512, 514, and interface with the second lower water jacket 408 at interface points 516, 518. The interface at all interface points 512, 514, 516, 518 between the upper water jacket 410 and both the first lower water jacket 406 and the second lower water jacket 408 share a common plane 520.

Figure 6:
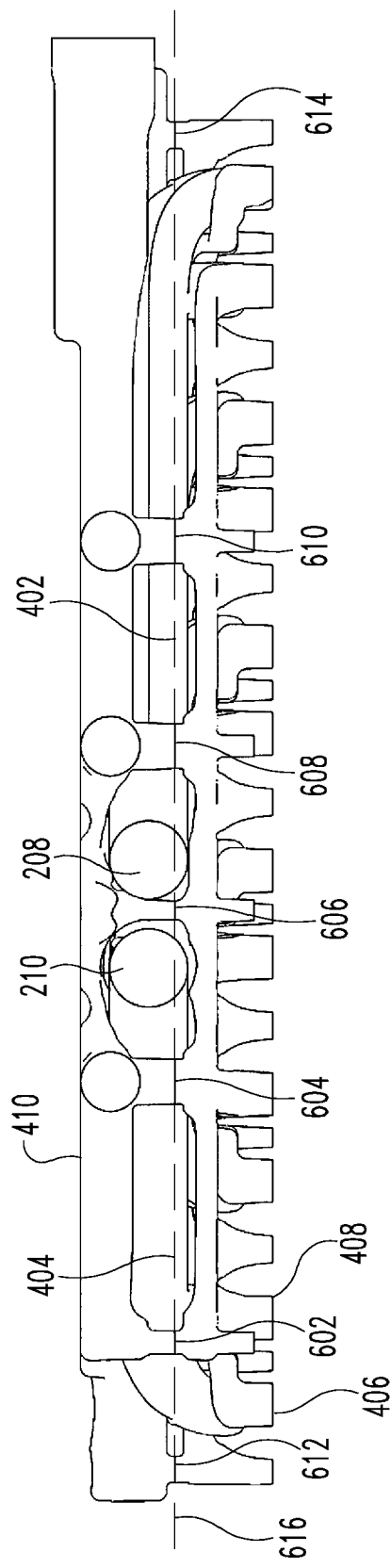
FIG. 6 is a side view of the first and second exhaust port cores and cooling system water jackets assembled in the cylinder head with integrated exhaust manifold body.

Referring to FIG. 6, a side view is shown looking into outlets 208, 210. The upper water jacket core 410 interfaces with the second lower water jacket core 408 at interface connections 602, 604, 606, 608, 610, and interfaces with the first lower water jacket core 406 at interface connections 612, 614. The interface connection 606 is configured to provide an as-cast cooling passage between the outlets 208 and 210 to provide localized high coolant velocity to cool a bridge material used between the outlets 208 and 210. Interface connections 604 and 608 at opposite outer sides of the outlets 208 and 210 are configured to provide as-cast cooling passages that promote improved cooling at a final bending portion of the first and second exhaust passages 302, 304 to be formed by exhaust passage cores 402 and 404 just prior to exhaust gas exiting the outlets 208 and 210. The other interface connections such as connection 610 may also provide additional as-cast cooling passages and support the cores during the casting process, and may also assist in cleaning core sand out of the raw casting during the casting process.

Figure 7:
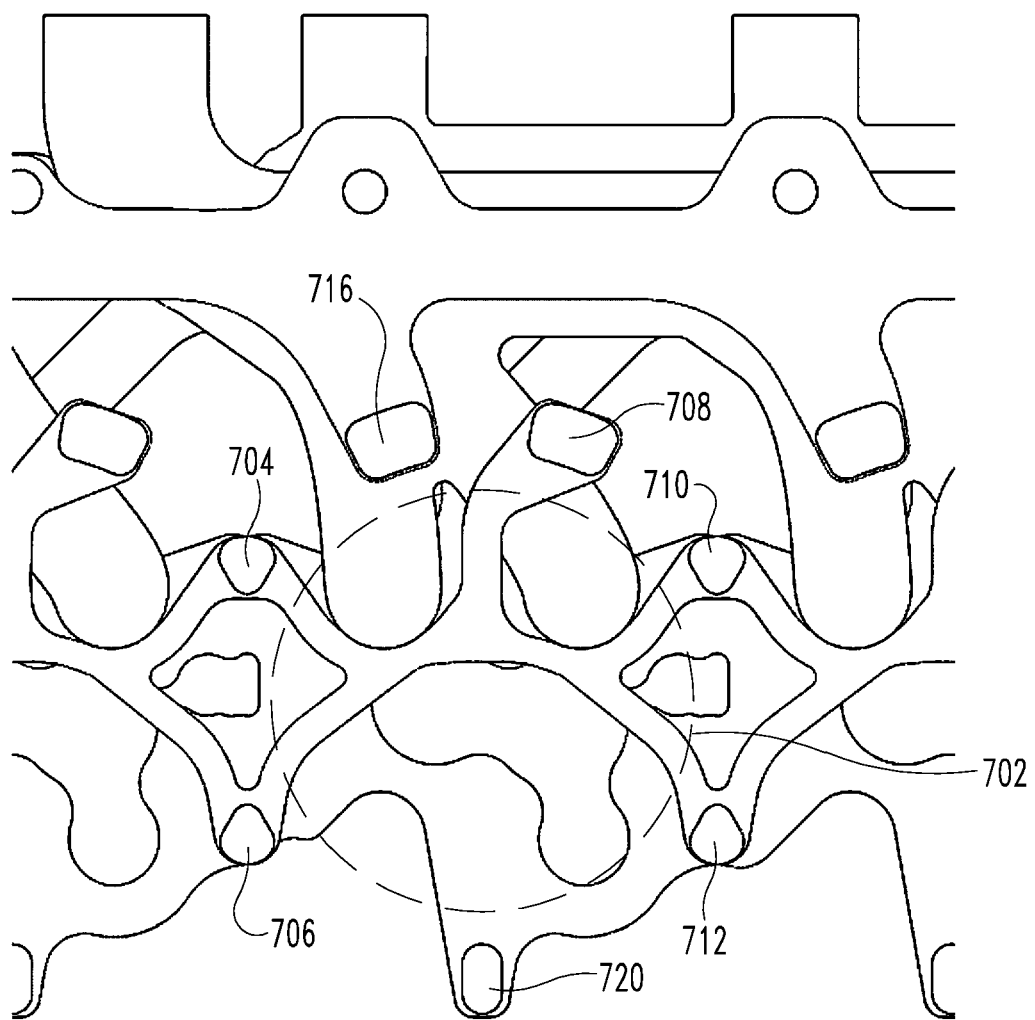
FIG. 7 is a bottom view of a single cylinder in the cylinder head with integrated exhaust manifold body with the cooling system water jackets positioning in the body relative to the single cylinder.

Referring to FIG. 7, a bottom view of the integrated exhaust manifold 203 with the cooling system positioning relative to a single cylinder 702 of the engine to which the cylinder assembly 200 is to be mounted is illustrated. Similar arrangements for the other engine cylinders may also be provided. In an exemplary embodiment, a water pump (not shown) may connect to a cooling system of a cylinder block (not shown) to circulate coolant to the integrated exhaust manifold 203 through an interface opening. For example, the first lower water jacket core 406 may provide various openings that interface with the cooling system of the engine block at interface openings 704, 706, 710, 712 positioned around the cylinder 702, and at an interface opening 708 on the exhaust side of the cylinder 702. The second lower water jacket core 408 may provide an opening to interface with the cooling system of the cylinder block at interface opening 716. The upper water jacket core 410 may provide an opening to interface with the cooling system of the cylinder block at interface opening 720 on, for example, an intake side of the cylinder 702.

The cooling system may include a head gasket (not shown) containing flow control orifices positioned between the cylinder block and cylinder head assembly 200. These flow control orifices may be used to control the flow of coolant into each interface opening, thus optimizing the cooling capability of the cylinder head assembly 200. Utilizing separate coolant passages formed by the first lower water jacket core 406 and the second lower water jacket core 408 prevents cross flow between the passages formed by the jacket cores 406 and 408 that would otherwise exist if their respective coolant passages were joined together.

Figure 8:
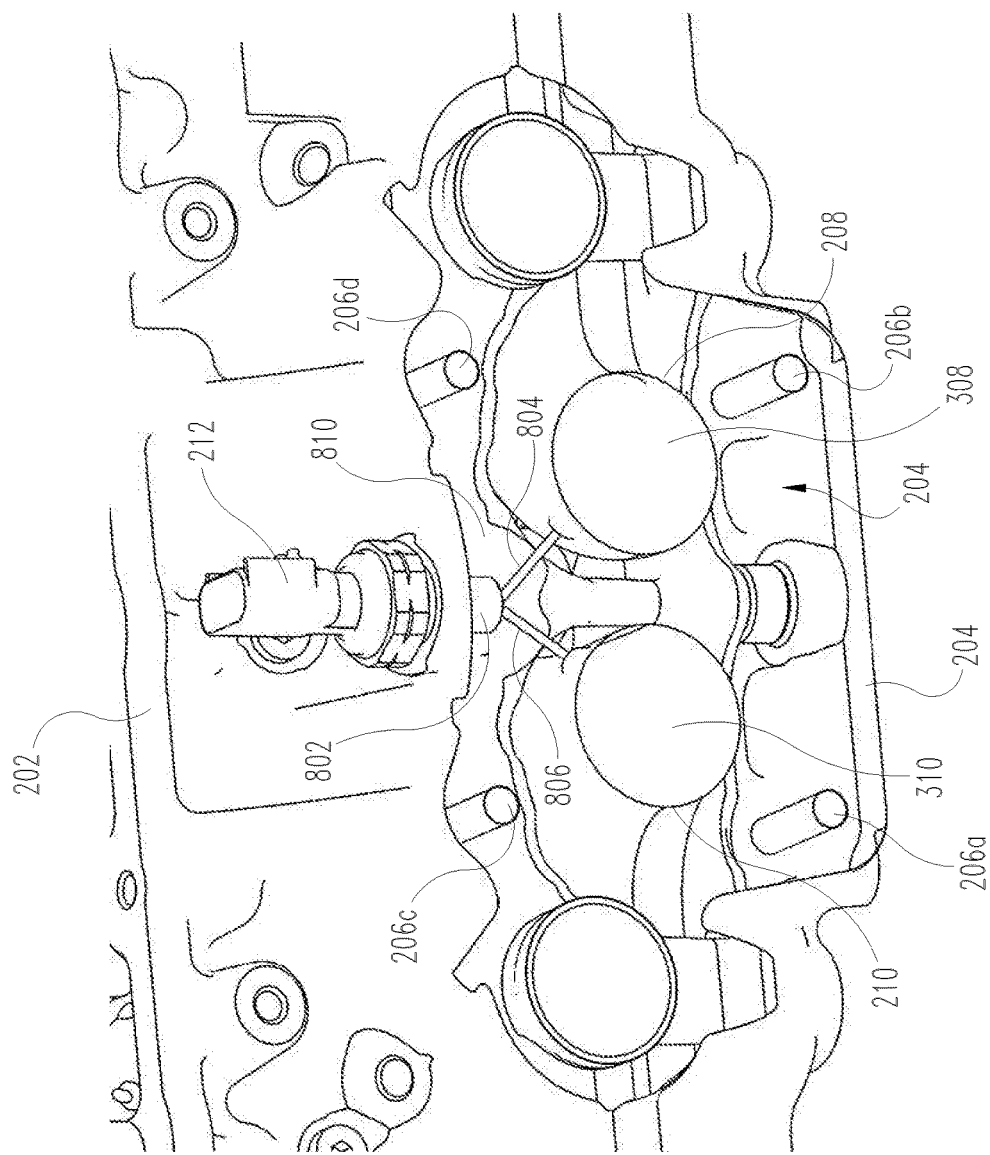
FIG. 8 is a perspective sectional view of at a turbocharger mounting flange on the cylinder head with integrated exhaust manifold body.

Referring to FIG. 8, the integrated exhaust manifold 203 includes the pressure sensor 212 positioned near the turbocharger flange 204. The integrated exhaust manifold 203 includes a pressure sensor passage 802 that can be machined or otherwise provided to accommodate the pressure sensor 212. The integrated exhaust manifold 203 also includes first and second fluid passages 804 and 806 that fluidly connect the pressure sensor 212 with the exhaust passages 302, 304. First and second fluid passages 804, 806 may be machined or otherwise formed in integrated exhaust manifold 203. For optimal pressure sensor 212 response, the first and second fluid passages 804 and 806 should be of the same size, length, and configuration. The first fluid passage 804 connects the pressure sensor passage 802 to the first duct 308. The second fluid passage 806 connects the pressure sensor passage 802 to the second duct 310. The upper water jacket core 410 can also be configured to include a cooling passage segment 810 that is positioned near the pressure sensor 212.

The cooling jacket segment 810 provides cooling fluid circulation for cooling of the pressure sensor 212 and may be used to prevent the pressure sensor 212 from exceeding a predetermined operating temperature.

Figure 8A:
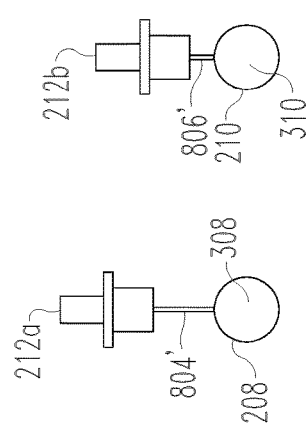
FIG. 8A is a schematic diagram showing an embodiment with two exhaust pressure sensors.

FIG. 8A shows another embodiment with two pressure sensors 212a, 212b connected to respective ones of the first duct 308 and the second duct 310 with first and second fluid passages 804', 806'. The two pressure sensors 212a, 212b can provide separate exhaust pressure readings from the respective exhaust passages 302, 304.

Figure 9:
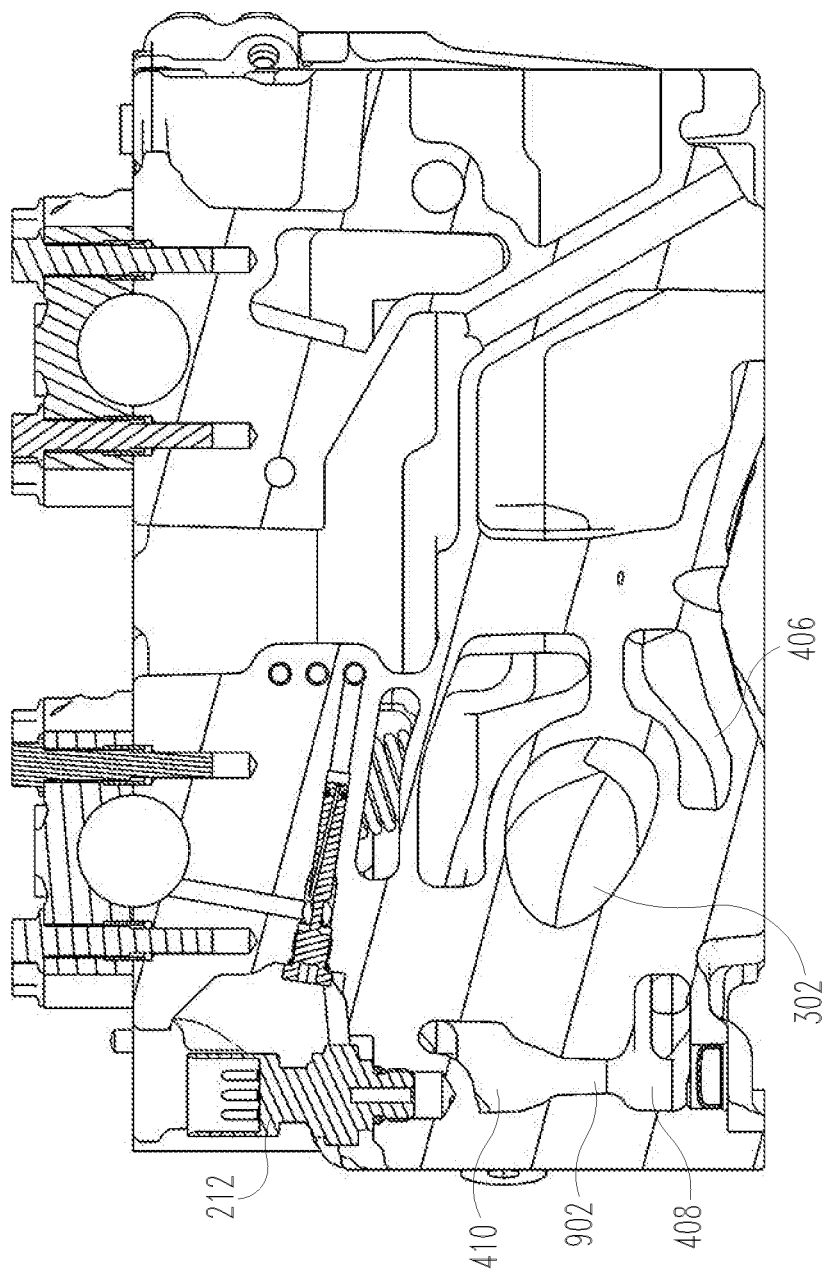
FIG. 9 is a cross-sectional view of the cylinder head with integrated exhaust manifold taken through the turbocharger mounting flange and between the ducts illustrating the cooling system passages in the body.

Referring to FIG. 9, a cross-sectional view illustrates the integrated exhaust manifold 203 with cooling passage segments formed by the first lower water jacket core 406 and the second lower water jacket core 408 provided below the first exhaust passage 302. A passage for the upper water jacket core 410 is provided above the first exhaust passage 302. A cast passage 902 connects the passages of the second lower water jacket core 408 to the upper water jacket core 410. According to an aspect, the cast passage 902 is positioned between the first and second ducts 308 and 310 at the outlets 208 and 210, respectively, for cooling of exhaust flow therein.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A cylinder head arrangement for an internal combustion engine, comprising:
   a cylinder head including two separate exhaust passages that are integrated into the cylinder head and exit the cylinder head at a location that engages with inlets of a turbocharger, the inlets arranged in a generally side-by-side orientation to receive exhaust from respective ones of the two separate exhaust passages.

2. The cylinder head arrangement of claim 1, wherein the two separate exhaust passages include a first exhaust passage for collecting exhaust from at least three cylinders and a second exhaust passage for collecting exhaust from at least three other cylinders.

3. A cylinder head arrangement for an internal combustion engine, comprising:
   a cylinder head including first and second exhaust passages that are integrated into the cylinder head and that exit the cylinder head to mate up with a turbocharger inlet, the cylinder head including a boss to mount an exhaust manifold pressure sensor and a coolant passage near the exhaust manifold pressure sensor to circulate coolant for cooling the sensor.

4. The cylinder head arrangement of claim 3, wherein the exhaust pressure sensor is connected to each of the first and second exhaust passages with respective ones of first and second fluid passages extending through the cylinder head.

5. The cylinder head arrangement of claim 3, wherein the first exhaust passage collects exhaust from at least three cylinders and the second exhaust passage collects exhaust from at least three other cylinders.

6. A cylinder head arrangement for an internal combustion engine, comprising:
a cylinder head including an exhaust manifold integrated into the cylinder head, wherein the integrated exhaust manifold includes a first exhaust passage for collecting exhaust from at least three cylinders and a second exhaust passage for collecting exhaust from at least three other cylinders, an upper water jacket, and two separate lower water jackets for circulating a cooling fluid to cool the exhaust in the first and second exhaust passages.

7. The cylinder head arrangement of claim 6, wherein the upper water jacket is configured to interface with portions of the two separate lower water jackets, the interface portions are aligned with one another in a plane that is parallel to a mounting surface of the cylinder head.

8. A cylinder head arrangement for an internal combustion engine, comprising:
an exhaust manifold integrated in a cylinder head and having first and second exhaust passages, the first exhaust passage for collecting exhaust gas from the cylinder head from at least three cylinders and directing the exhaust gas to a first outlet of the cylinder head, and the second exhaust passage for collecting exhaust gas from the cylinder head from at least three cylinders and directing the exhaust gas to a second outlet of the cylinder head; and
a flange on the exhaust manifold and the first and second outlets open at an outer surface of the flange.

9. The cylinder head arrangement of claim 8, wherein the first and second exhaust passages are cast into the cylinder head using a first exhaust passage core and a second exhaust passage core, respectively.

10. The cylinder head arrangement of claim 8, further comprising a first lower water jacket and a second lower water jacket positioned below the first and second exhaust passages.

11. The cylinder head arrangement of claim 10, further comprising an upper water jacket positioned above the first and second exhaust passages.

12. The cylinder head arrangement of claim 11, wherein the first and second lower water jackets and the upper water jacket are connected with one another for circulation of a cooling fluid therethrough.

13. The cylinder head arrangement of claim 11, wherein the upper water jacket is configured to interface with portions of the first and second lower water jackets, the interface portions are aligned with one another in a plane that is parallel to a mounting surface of the cylinder head.

14. The cylinder head arrangement of claim 11, wherein the upper water jacket interfaces with the second lower water jacket between the first and second outlets adjacent the flange.

15. The cylinder head arrangement of claim 11, wherein the upper water jacket interfaces with the second lower water jacket at opposite sides of the first and second outlets to provide cooling of the first and second exhaust passages adjacent the flange.

16. The cylinder head arrangement of claim 8, further comprising:
an exhaust manifold pressure sensor mounted to the cylinder head adjacent the flange;
a first fluid passage connecting the pressure sensor to the first exhaust passage; and
a second fluid passage connecting the pressure sensor to the second exhaust passage.

17. The cylinder head of claim 16, wherein the upper water jacket includes a coolant passage near the exhaust manifold pressure sensor to provide cooling of the exhaust manifold pressure sensor.

18. A cylinder head arrangement for an internal combustion engine, comprising:
a cylinder head including a first plurality of exhaust passages and a second plurality of exhaust passages integrated into the cylinder head to collect exhaust gas, the cylinder head configured to allow the exhaust gas to exit the first and second plurality of exhaust passages at an exhaust gas outlet of the cylinder head to mate with a turbocharger inlet coupled to the exhaust gas outlet, the cylinder head including a first fluid passage connecting the first integrated exhaust passages to at least one exhaust manifold pressure sensor, and a second fluid passage connecting the second integrated exhaust passages to the at least one exhaust manifold pressure sensor.

19. The cylinder head arrangement of claim 18, wherein the cylinder head defines a coolant passage near the at least one exhaust manifold pressure sensor for cooling the at least one exhaust manifold pressure sensor.

20. The cylinder head arrangement of claim 19, wherein the at least one exhaust manifold pressure sensor includes first and second exhaust manifold pressure sensors connected to respective ones of the first and second plurality of exhaust passages with corresponding ones of the first and second fluid passages.

21. The cylinder head arrangement of claim 18, wherein the first plurality of exhaust passages collects exhaust from at least three cylinders and the second plurality of exhaust passages collects exhaust from at least three other cylinders.

* * * * *